US006548762B2

(12) United States Patent
Jiles et al.

(10) Patent No.: US 6,548,762 B2
(45) Date of Patent: Apr. 15, 2003

(54) TRANSMISSION LINE GROUNDING LUG

(75) Inventors: Mekell Jiles, South Holland, IL (US);
Richard Korczak, Channahon, IL (US);
Robert Walter, Franklin Park, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/790,398

(22) Filed: Feb. 21, 2001

(65) Prior Publication Data

US 2002/0112874 A1 Aug. 22, 2002

(Under 37 CFR 1.47)

(51) Int. Cl.[7] ................................................. H02G 3/02
(52) U.S. Cl. ........................................................ 174/78
(58) Field of Search .............................. 174/78, 40 CC

(56) References Cited

U.S. PATENT DOCUMENTS

| 3,253,247 | A | * | 5/1966 | Vos ................................. 174/78 |
| 3,549,787 | A | | 12/1970 | Churla, Jr. ..................... 174/78 |
| 3,568,128 | A | * | 3/1971 | Taylor ............................ 24/335 |
| 3,798,349 | A | * | 3/1974 | Thompson et al. ........... 174/78 |
| 4,051,323 | A | | 9/1977 | Churla ........................... 174/78 |
| 4,325,598 | A | * | 4/1982 | Leonardo ...................... 439/391 |
| 4,613,191 | A | * | 9/1986 | Papa .............................. 174/78 |
| 5,281,761 | A | * | 1/1994 | Woo et al. ..................... 174/78 |
| 5,597,314 | A | | 1/1997 | Auclair et al. ................ 439/98 |
| 5,722,841 | A | * | 3/1998 | Wright .......................... 174/78 |
| 5,850,056 | A | | 12/1998 | Harwath ..................... 174/40 CC |
| 5,912,434 | A | * | 6/1999 | Robinson ...................... 174/78 |
| 6,297,447 | B1 | * | 10/2001 | Burnett et al. ............. 174/40 CC |

FOREIGN PATENT DOCUMENTS

| GB | 2 232 020 A | 11/1990 | ............ H01R/4/64 |
| GB | 2 331 869 A | 6/1999 | ............ H01R/4/64 |

* cited by examiner

Primary Examiner—Lynn D. Feild
Assistant Examiner—Brian S. Webb
(74) Attorney, Agent, or Firm—Jenkens & Gilchrist

(57) ABSTRACT

A device for grounding a transmission line having a diameter and an outer portion partially removed, revealing an exposed section. The grounding device includes an insert connected to the exposed section of the transmission line. A contact mechanism is included on the grounding device and electrically connects the exposed section of the transmission line. The contact mechanism automatically adjusts to fit the diameter of the transmission line, so that an electrical contact may be maintained with transmission lines having a variety of diameters. The device also includes a grounding line coupled to the insert, thus, providing a ground for the transmission line.

38 Claims, 8 Drawing Sheets

TRANSMISSION LINE GROUNDING LUG

FIELD OF THE INVENTION

This invention relates generally to transmission line and, more particularly, to an electrical grounding lug which grounds the transmission line.

BACKGROUND OF THE INVENTION

Many transmission lines are subject to power surges from high energy conditions such as lightening strikes. The likelihood of being struck by lightening is increased if the transmission line is coupled to a device located on highly elevated structures, for example, an antenna on a tower. Grounding the transmission line is required to protect both the line and the base station equipment from these power surges related to lightening strikes.

Grounding may be accomplished by maintaining electrical contact between a grounding line and the outer conductor of the cable. This may be done by simply removing a portion of the outer cover of the cable to expose the outer conductor and making a contact. Most transmission lines, however, are used in places where such an open connection is not practical. The exposed section of the transmission line must be protected from the environment. Without adequate protection, the exposed area is subject to corrosion and eventual failure.

It is also desired that a high contact pressure be maintained between the conductor and the grounding line, since the grounding line is designed to handle high current conditions. Furthermore, in the case of a lightening strike, the magnetic forces of the bolt of lightening tend to cause the grounding line and conductor to repel from one another. The high contact pressure is also often difficult to maintain due to the variability of sizes of transmission lines, requiring that special clamps and/or contacts be made depending on the size of the transmission line.

To seal the exposed conductor after the grounding line is attached, tape is often used. Multiple tapes are needed in many cases so that the conductor is sealed from a variety of environmental issues. Using multiple tapes creates a burden on the installer both in the number of items that must be brought to every installation and in the time it takes to completely finish the installation. In addition, when the installer is forced to work in unfavorable conditions, such as sleet or rain, the integrity of the taping process may be compromised.

In systems which do not use tape, a clamp must be forced onto the conductor and the grounding line at the contact point. To effectively place the clamp, however, the installer must use great force. In adverse weather conditions, such as rain, the clamp may become slippery, making it difficult to use.

These systems also require the use of a separate housing to protect the exposed transmission line from the environment. Not only may the housing be cumbersome, placing the ground line and the transmission line in the housing adds an additional step for the installer, who may be working in adverse environments, such as snow or rain. The installer working under such conditions may also do a less thorough job in an effort to get out of the bad weather.

Another problem with many systems is the number of tools that need to be used for installation. A high number of tools increases the burden on the installer in terms of what must be carried and in time of installation.

Therefore, a need exists for a durable grounding device for grounding transmission lines which is capable of providing high contact pressure between the grounding line and transmission lines of a variety of sizes. A need also exists for a grounding device which is easy to assemble in adverse environments. Furthermore, a need exists for a sealing device which provides a reliable seal over the exposed section of the cable.

SUMMARY OF THE INVENTION

A device for grounding a transmission line having a diameter and an outer portion partially removed, revealing an exposed section, comprises an insert which is connected to the exposed section of the transmission line. A contact mechanism is included in the insert and provides an electrical contact with the exposed section of the transmission line. The contact mechanism is designed so it automatically adjusts to fit the diameter of the transmission line. The device further includes a grounding line coupled to the insert and, thus, the transmission line.

BRIEF DESCRIPTION OF THE DRAWINGS

The foregoing and other advantages of the invention will become apparent upon reading the following detailed description and upon reference to the drawings.

Figure 1:
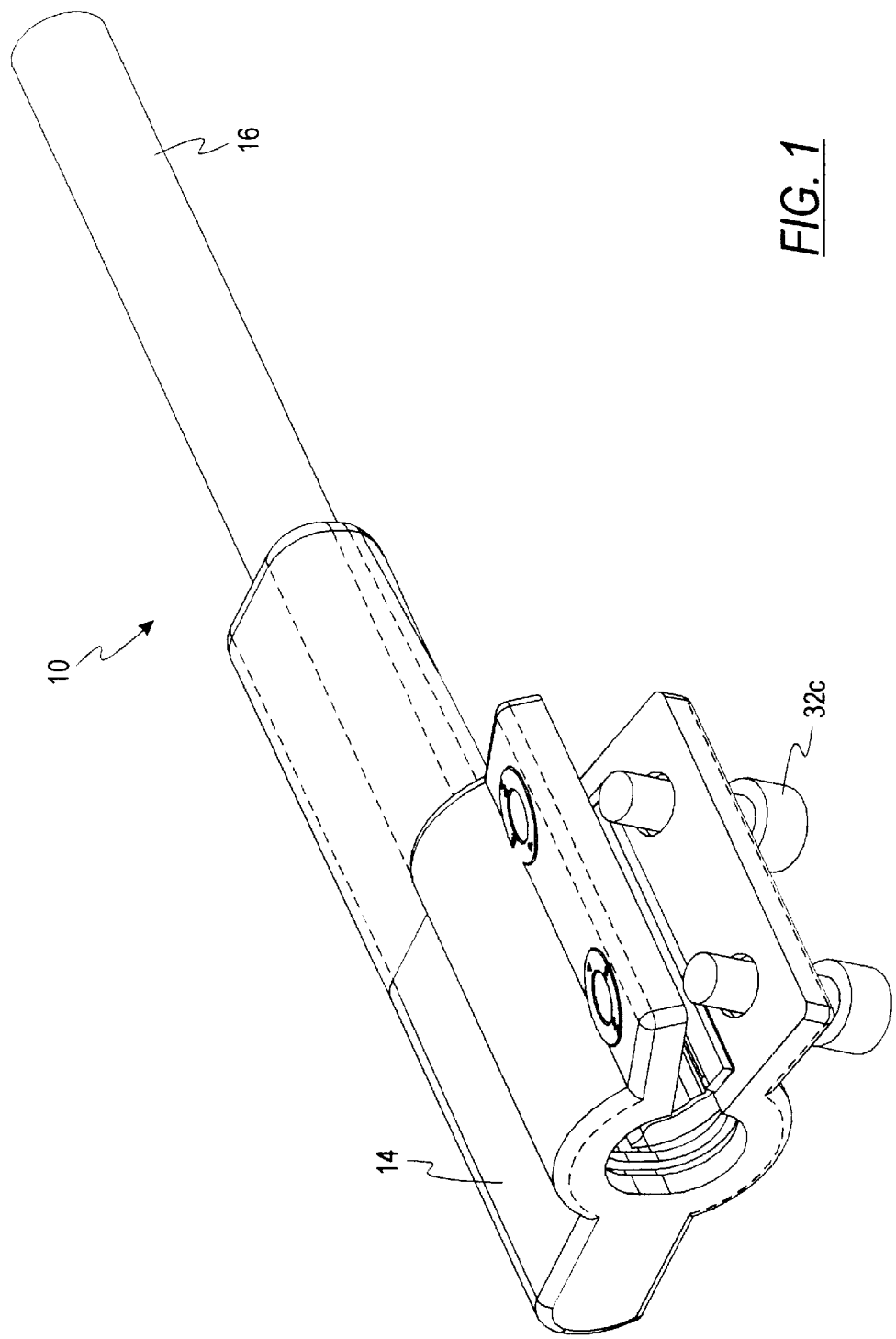
FIG. 1 is a perspective view of a grounding device according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 2:
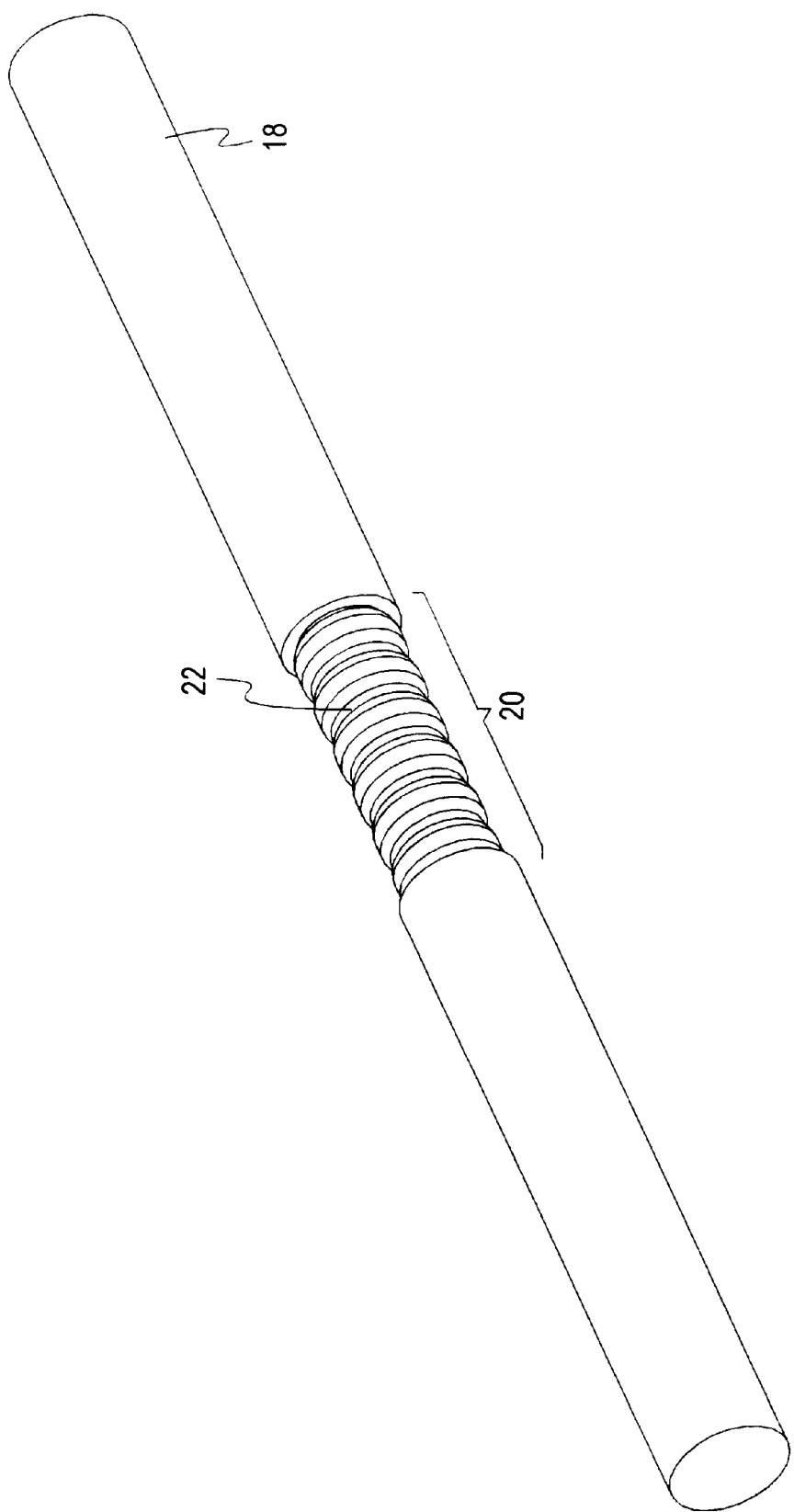
FIG. 2 is a perspective view of a transmission line with an exposed section exposing an outer conductor.

Referring initially to FIG. 1, a completed grounding assembly 10 of the present invention is shown. The grounding assembly 10 includes an insert 12 (shown in FIG. 2), a jacket 14, and a grounding line 16. The grounding assembly 10 is used to provide a ground for a transmission line. For ease of description, the transmission line used will be a coaxial cable 18 (shown in FIG. 2), but other types are contemplated, such as a waveguide. The cable 18 is typically connected between an antenna (not shown) and a base station, and needs to be grounded to protect the cable 18, the antenna, and the base station equipment from possible electrical surges from lightening strikes. This is achieved by providing an electrical connection between the cable 18 and the grounding line 16. The grounding line is connected to the tower/earth ground systems.

The electrical connection is achieved by stripping away a portion of the outer cover of the cable 18, which creates an exposed section 20 of an outer conductor 22 of the cable 18. By connecting the outer conductor 22 to the grounding line 16, the cable 18 is grounded. The insert 12 provides the connection between the outer conductor 22 and the grounding line 16. The jacket 14 is molded over the insert 12 and the exposed section 20 of the cable 18 to protect the insert 12 and the exposed section 20 of the cable 18 from corrosion.

Figure 3:
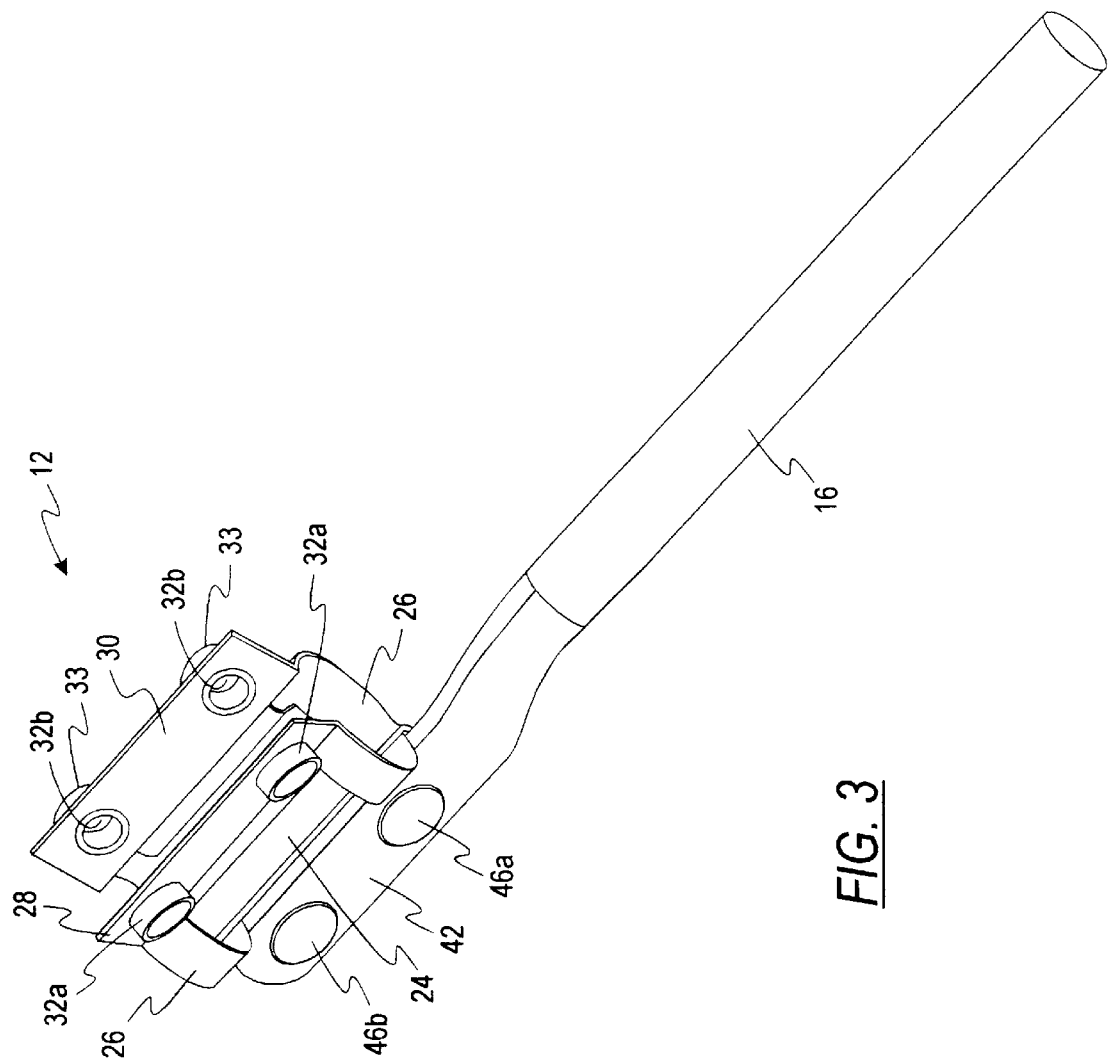
FIG. 3 is a perspective view of a grounding device without a jacket according to one embodiment of the present invention.
Figure 4:
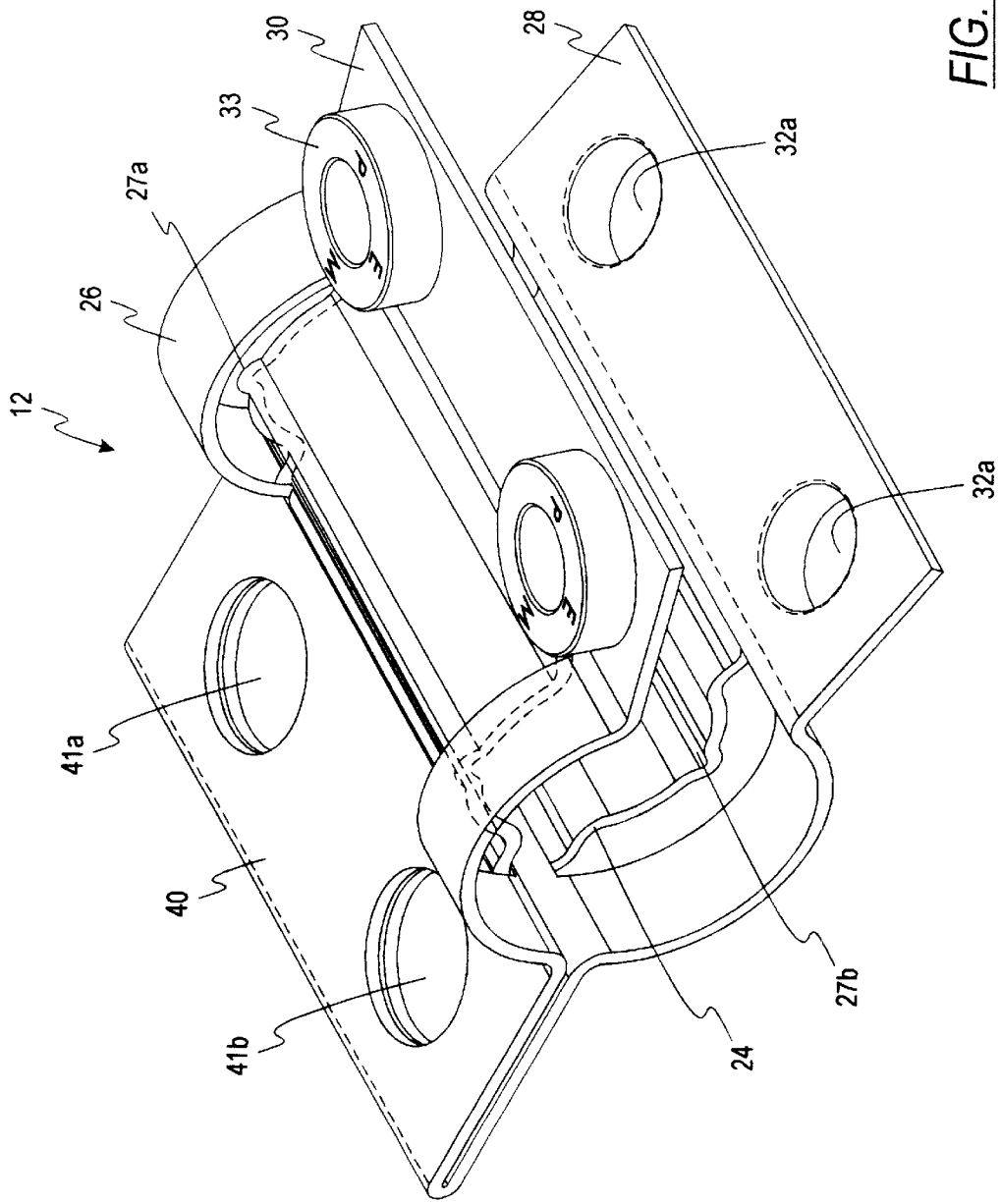
FIG. 4 is a schematic view of an insert according to one embodiment of the present invention.

Turning now to FIGS. 3 and 4, the insert 12 includes an inner surface 24 and an outer surface 26. The outer surface 26 has a diameter which is larger than a diameter of the inner surface 24. The inner surface 24 is a contact portion where the outer conductor 22 of the cable 18 (shown in FIG. 2) contacts the insert 12 and, thus, provides an electrical connection between the outer conductor 22 and the insert 12.

In one embodiment, the inner surface 24 is created by stamping, which causes the inner surface 24 to indent from the outer surface 26. The stamping causes a pair of bends 27a, 27b opposite each other. The bends 27a, 27b give the inner surface 24 flexibility to stretch if a cable 18 is placed in the insert 12 which has a diameter larger than the diameter of the inner surface 24. The inner surface 24 can stretch and still remain in contact with the exposed section 20 of the coaxial cable 18. Therefore, the inner surface 24 is capable of keeping contact with the exposed section 20 of the coaxial cable 18, which may have a diameter greater than the diameter of the inner surface 24, but less than the diameter of the outer surface 26. Unlike prior inserts or contacts, the insert 12 adjusts automatically to the diameter of the coaxial cable 18, requiring less work for the installer. Instead of either having to adjust the insert at the site to fit the cable 18 or having to carry a number of inserts of different sizes to the site, the installer only needs to know the approximate size of the diameter of the coaxial cable 18.

In one embodiment, the diameter of the inner surface 24 is approximately 0.225 to about 0.390 inches, and the diameter of the outer surface 26 is approximately 0.300 to about 0.470 inches. In another embodiment, the diameter of the inner surface 24 is approximately 1.300 to about 1.600 inches, and the diameter of the outer surface 26 is approximately 1.400 to about 1.700 inches. It is also contemplated that the insert 12 and inner surface 24 could be made with a wide variety of sizes, so long as the inner surface 24 retains enough rigidity to stay in contact with the exposed section 20 of the coaxial cable 18.

As mentioned above in reference to the inner surface 24, the bends 27a, 27b are created during the stamping process. The bends 27a, 27b may be a variety of shapes, such as rectangular, triangular, or curved. It is important that the bends 27a, 27b, not be too large, or portions of the coaxial cable 18 may become stuck in the bends 27a, 27b, making it difficult to close and lock the insert 12. The smaller the bends 27a, 27b or the more angled or triangular the bends 27a, 27b, the more difficult it is for the coaxial cable 18 to become stuck. This feature is also an improvement because it enables easy closing and latching by the installer (which is discussed below). Less force is needed to close the insert 12. If the bends 27a, 27b are triangular, the closing is made especially simple since it is very difficult for portions of the coaxial cable 18 to get stuck.

The insert 12 also includes a latching mechanism for locking the coaxial cable 18 in place within the insert 12. In one embodiment, the latching mechanism comprises a first flange 28 and a second flange 30 which extend outwardly from the insert 12. The first flange 28 and the second flange 30 are adapted to be connected to each other to lock the coaxial cable 18 in place once the cable 18 has been placed into the insert 12. As best shown in FIG. 4, one method for locking the first flange 28 to the second flange 30 is to provide a pair of through holes 32a, 32b on each of the first and second flanges 28, 30. The through holes 32a, 32b are disposed such that a single screw 32c (FIG. 1) can be placed through both the first and second flanges 28, 30. In one embodiment, a PEM insert 33 is inserted into the through holes 32b of the second flange 30. The PEM insert 33 is used to provide the threading to accept the screw 32c. Threading copper can cause stripping, so the PEM insert 33 may be used to prevent such problems from occurring.

Figure 5:
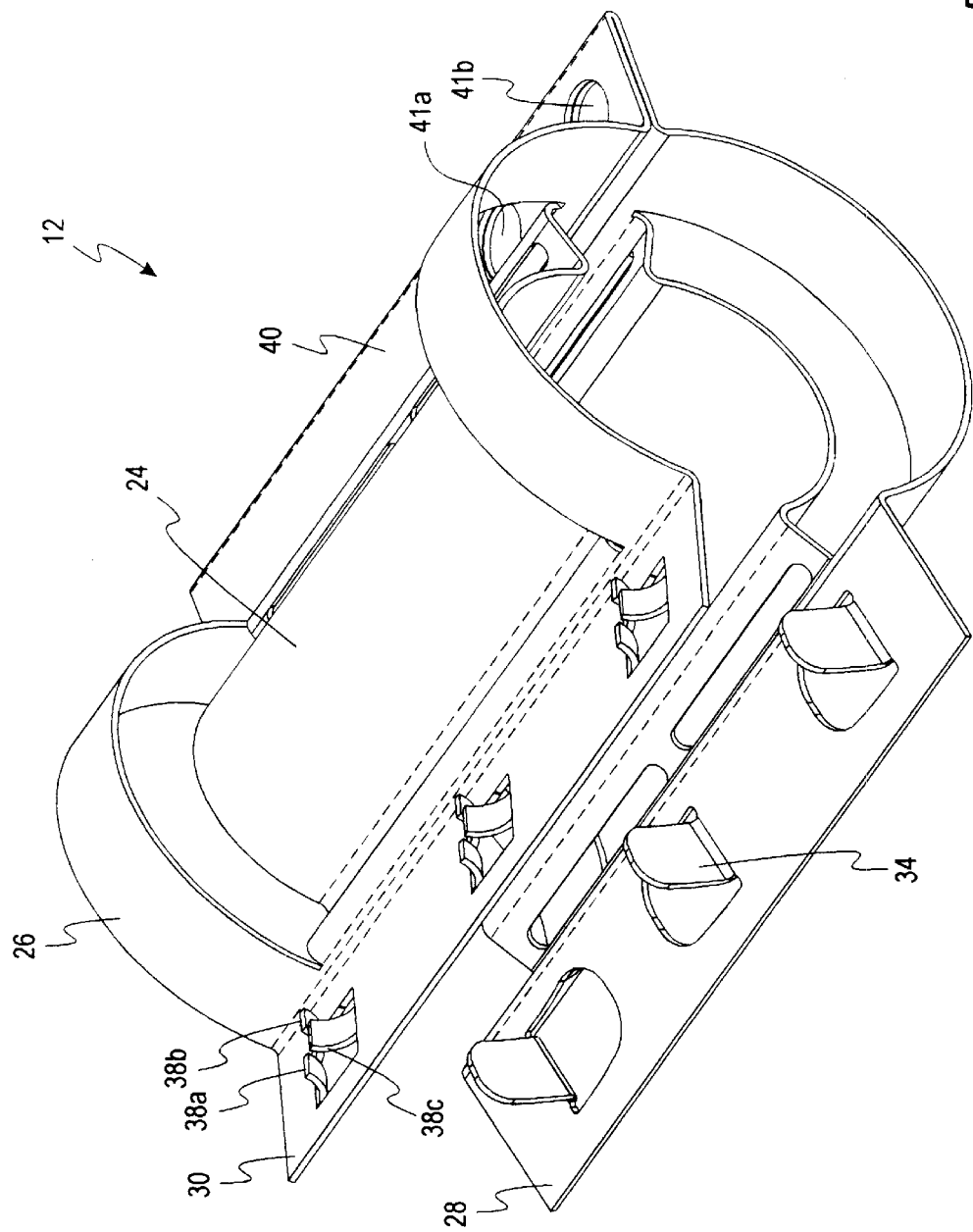
FIG. 5 is a schematic view of an insert according to another embodiment of the present invention.
Figure 6A:
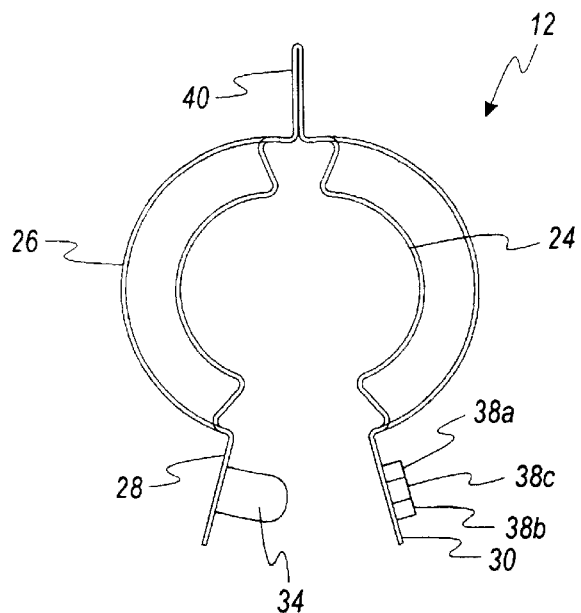
FIGS. 6a–c are schematic drawings of various portions of FIG. 5
Figure 6B:
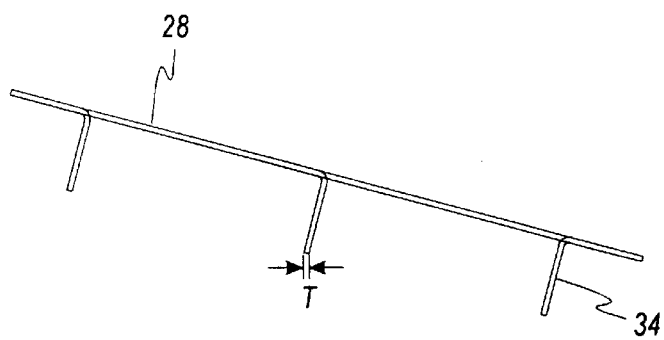
Figure 6C:
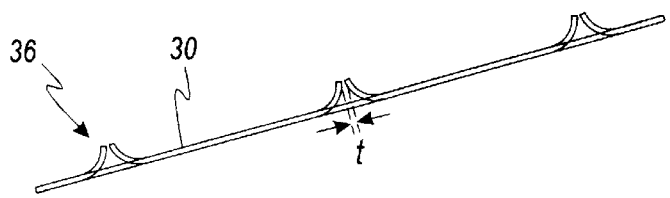

Another way to lock the insert 12 is shown in FIGS. 5 and 6a–c. FIG. 5 is a perspective view of one embodiment of the insert 12, and FIGS. 6a–c are schematic views of the insert 12 and the first and second flanges 28, 30. The first flange 28 has at least one male member 34 having a thickness T (shown in FIG. 6b). The male member 34 is flexible, and may be bent perpendicular to the first flange 28. The male member 34 is pushed through a three pronged female member 36 on the second flange 30. The three pronged female member 36 has two prongs 38a, 38b hinged on one side of the female member 36, and a third prong 38c hinged on an opposite side of the female member 36. The three prongs 38a, 38b, 38c create a small gap having a thickness t (shown in FIG. 6c). The thickness t of the gap is smaller than the thickness T of the male member 34. As the male member 34 is pushed into the gap, the three prongs 38a, 38b, 38c grip the male member 34. Thus, the prongs 38a, 38b, 38c effectively hold the male member 34 and the first flange 28 in engagement with the female member 36, and the second flange 30 is now locked to the first flange 28.

Figure 7:
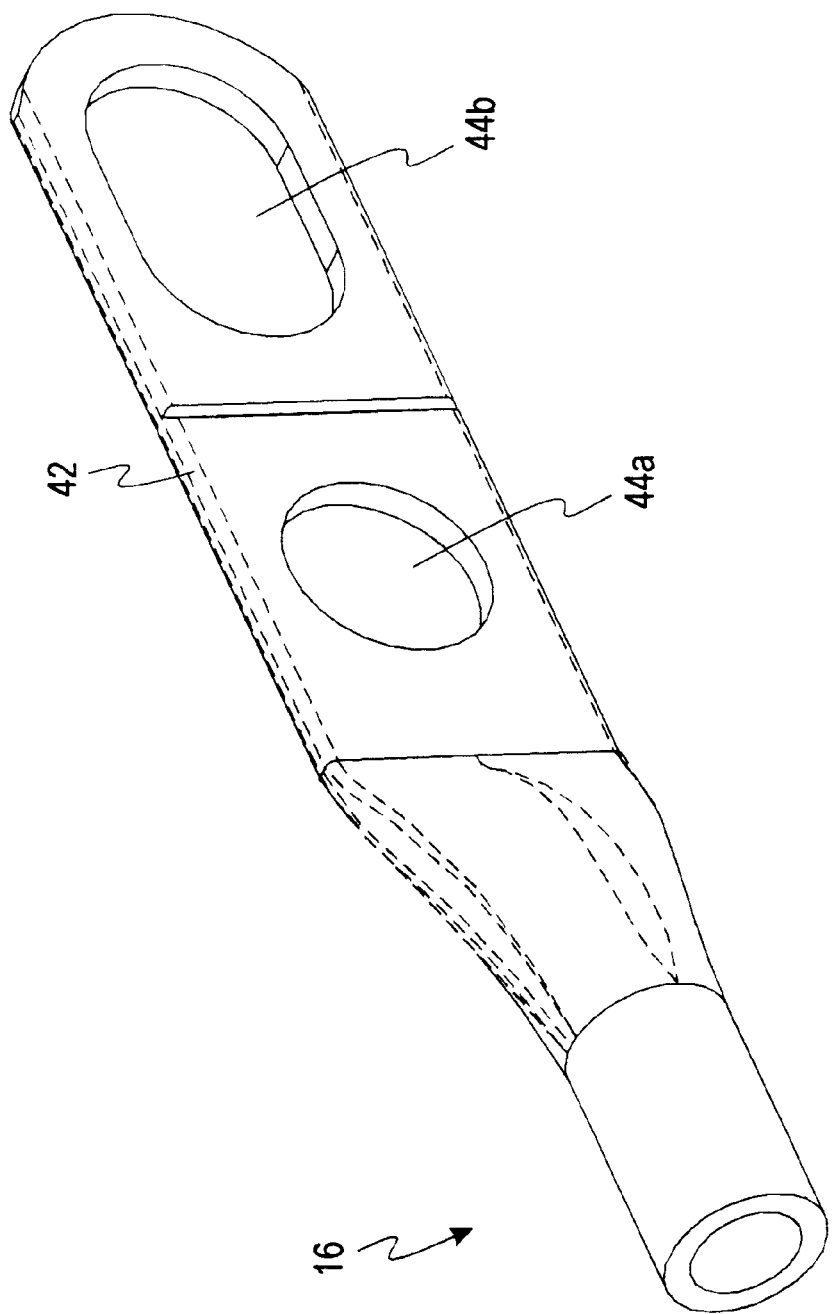
FIG. 7 is a perspective view of the grounding line of one embodiment of the present invention.

Returning now to FIG. 4, a third flange 40 is also included on the insert 12, having two holes 41a, 41b. The third flange 40 is used to connect the insert 12 to a flat portion 42 of the grounding line 16 (shown in FIG. 7). The flat portion 42 includes two holes 44a, 44b through which two rivets 46a, 46b (shown in FIG. 3) are inserted to lock the grounding line 16 and the insert 12 together. The insert 12 and the grounding line 16 are then in electrical connection, as well. In one embodiment, the grounding line 16 does not have a flat portion and is connected at any part of the line. In yet another embodiment, any number of holes and rivets may be used to connect the grounding line 16 to the insert 12. In addition to using rivets and holes, the insert 12 may be connected to the grounding line 16 using other conventional methods, such as ultrasonic bonding or brazing. The insert 12, in one embodiment, is made of a high performance, high conductive copper alloy, such as CD 11000. The rivets 46a, 46b may also be of CD 11000. The grounding line 16 is also made of a cuprous material, such as a multistrand heavy duty copper. This minimizes the resistance between the insert 12, the grounding line 16, and the rivets 46a, 46b.

Figure 8:
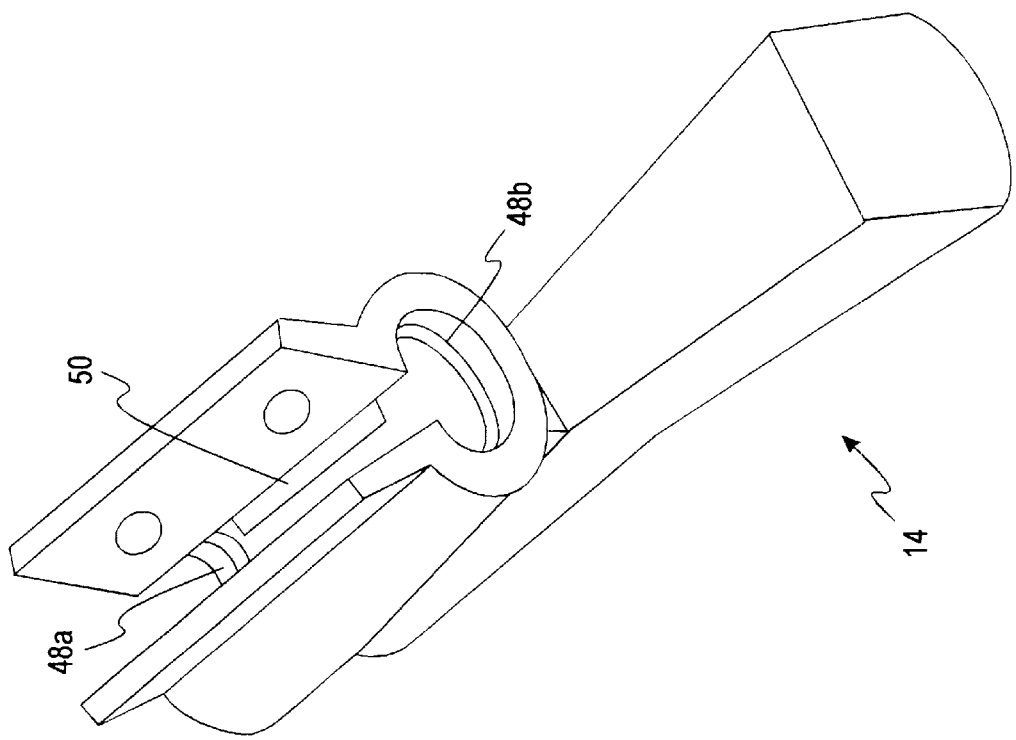
FIG. 8 is a perspective view of the jacket.

Turning now to FIG. 8, the jacket 14 is molded over the insert 12 and a portion of the grounding line 16 The jacket 14 is preferably made of a plastic, such as SANTOPRENE®, made by Elastomer Systems. The jacket 14 is weatherproof, thereby protecting the insert 12 and grounding line 16 from unfavorable outside conditions and preventing corrosion and malfunctions due to weather conditions.

The jacket 14 also has molded ridges 48a, 48b on each end which act to seal the exposed section 20 of the coaxial cable 18 from the environment. The ridges 48a, 48b extend around the entire circumference of the jacket 14 and abut the coaxial cable 18, creating a weatherproof seal. In prior grounding devices, housings were often used which were connected to the grounding device after the coaxial cable was connected. Installation of such devices required two steps, a first step to connect the coaxial cable to the insert and ground, and then a second step to install the combination in the housing. Unlike those devices, by providing the jacket 14 directly on the grounding device, only one step is needed during installation, which saves time, as well as manufacturing costs. Also, the housings of the prior art created one more item for the installer to carry.

To ensure that electrical contact is maintained between the insert 12 and the coaxial cable 18, the jacket 14 has at least one opening 50. The opening 50 allows an electrical connection between the inner surface 24 of the insert 12 and the exposed section 20 of the coaxial cable 18. The coaxial cable 18 and insert 12 (and, thus, the grounding line 16) remain in electrical contact despite the presence of the jacket 14.

While the present invention has been described with reference to one or more particular embodiments, those skilled in the art will recognize that many changes may be made thereto without departing from the spirit and scope of the present invention Each of these embodiments and obvious variations thereof is contemplated as falling within the spirit and scope of the claimed invention, which is set forth in the following claims.

What is claimed is:

1. A device for grounding a transmission line having a diameter, the grounding device comprising:
    an insert connected to the transmission line, said insert having a contact mechanism adapted to cause said insert to be in electrical contact with the transmission line, wherein said contact mechanism is adapted to adjust to fit the diameter of the transmission line, said contact mechanism comprising an inner portion and an outer portion, said inner portion indented from said outer portion; and
    a grounding line coupled to said insert.

2. The device according to claim 1, further comprising a jacket covering said insert, a section of the transmission line, and a portion of said grounding line, said jacket adapted to seal said insert and the section of the transmission line inside said jacket.

3. The device according to claim 2, wherein said jacket further comprises a sealing mechanism adapted to seal the section of the transmission line inside said jacket.

4. The device according to claim 3, wherein said jacket has a first end and a second end, and said sealing mechanism comprises a first ridge at said first end and a second ridge at said second end.

5. The device according to claim 2, wherein said jacket further comprises at least one open portion to place the section of the transmission line in electrical contact with the grounding line.

6. The device according to claim 2, wherein said jacket is adapted to be molded onto said insert.

7. The device according to claim 1, wherein said inner portion has a diameter equal to or less than the diameter of the transmission line.

8. The device according to claim 1, wherein said inner portion comprises shaped folds adapted to cause said inner portion to stretch to accommodate the diameter of the transmission line.

9. The device according to claim 8, wherein said shaped folds are rectangular.

10. The device according to claim 8, wherein said shaped folds are triangular.

11. The device according to claim 8, wherein said shaped folds are circular.

12. The device according to claim 1, wherein said insert is made of a cuprous alloy.

13. The device according to claim 12, wherein said cuprous alloy is CD 11000.

14. The device according to claim 1, wherein said insert further comprises a latching mechanism, adapted to lock the transmission line in a position with said insert.

15. The device according to claim 14, wherein said latching mechanism comprises a first flange and a second flange, said first and second flanges adapted to connect, thereby causing said clamp to lock the transmission line in place.

16. The device according to claim 15, wherein said latching mechanism further comprises a screw adapted to connect said first and second flanges, thereby causing said clamp to lock the transmission line in place.

17. The device according to claim 15, wherein said latching mechanism is adapted to be closed without the use of tools.

18. The device according to claim 17, wherein said first flange has at least one finger and said second flange has at least one flexible finger adapted to engage said at least one finger on said first flange to lock said first flange and said second flange in position.

19. The device according to claim 18, wherein said second flange comprises two flexible fingers generally opposed to one another and a gap between said two flexible fingers, said gap being smaller than a width of said finger of said first flange, such that when said finger of said first flange is inserted into said gap, said flexible opposing fingers of said second flange grip said finger of said first flange, locking said finger of said first flange into place.

20. The device according to claim 1, wherein said insert further comprises an outwardly extending flange to which said grounding line is coupled.

21. The device according to claim 20, wherein said third flange includes a rivet, said rivet connecting said outwardly extending flange to said grounding line.

22. The device according to claim 20, wherein said grounding line comprises a flat portion adapted to be connected to said outwardly extending flange.

23. The device according to claim 22, wherein said flat portion includes a rivet, said rivet connecting said outwardly extending flange to said flat portion of said grounding line.

24. The device according to claim 1, wherein said insert is one metal piece stamped into shape.

25. The device according to claim 24, wherein said insert is folded along a line on an outwardly extending flange.

26. The device according to claim 1, wherein said device is adapted for use with a coaxial cable.

27. The device according to claim 1, wherein said device is adapted for use with a waveguide.

28. A device for grounding a transmission line having a diameter, the grounding device comprising:
    a grounding line;
    a conductive insert connected to said grounding line and having a contact mechanism adapted to provide electrical contact with the transmission line and said insert, the insert further having a latching mechanism to lock the transmission line in electrical contact with said grounding line, wherein said latching mechanism comprises a plurality of flexible fingers adapted to engage each other and lock the transmission line into place; and a jacket adapted to cover said insert, a section of the transmission line, and a portion of said grounding line.

29. An insert for attaching a grounding line to a transmission line having a diameter and an exposed section, the insert comprising:

an outer portion having a diameter, said outer portion coupled to the grounding line; and an inner portion indented from said outer portion and having a diameter less than said diameter of said outer portion, wherein said inner portion directly contacts a part of the exposed section of the transmission line and said inner portion is adapted to adjust to fit the diameter of the transmission line.

30. The insert according to claim 29, further comprising a first flange and a second flange, wherein said first and second flange are connectable, locking said insert in a position.

31. A method of providing electrical grounding to an electrical conductor of a transmission line, said method comprising the steps of:

exposing a section of said electrical conductor;

providing an insert connected to a grounding line, said insert comprising an inner portion and an outer portion, said inner portion indented from said outer portion;

placing said insert around said exposed section of said electrical conductor such that said insert adjusts to contact said electrical conductor; and locking said insert in a closed position.

32. The method according to claim 31, further comprising environmentally sealing said insert along the transmission line.

33. The method according to claim 32, wherein said environmentally sealing further comprises providing a jacket around said insert, a portion of said grounding line, and the exposed section of the transmission line.

34. A method of providing an electrical grounding to an electrical conductor of a transmission line, said method comprising the steps of:

exposing a section of said electrical conductor;

providing a grounding assembly including an insert and a jacket adapted to cover said insert, said insert comprising an inner portion and an outer portion, said inner portion indented from said outer portion;

placing said insert and jacket around the exposed section of the transmission line such that said insert adjusts to contact the exposed section of the transmission line; and locking said insert and said jacket in a closed position.

35. A method of making a grounding device, comprising the steps of:

providing a sheet of a conductive metal;

stamping said sheet of metal such that an inner portion is formed indented from an outer portion and that said inner portion is formed to adjust to contact a transmission line; and folding said sheet over, forming a circular shape such that said inner portion has a diameter less than said outer portion.

36. The method according to claim 35, further comprising:

forming a first flange on one end of said sheet, opposite said fold; and forming a second flange on another end of said sheet opposite said fold, wherein said first flange is adapted to lock to said second flange.

37. The method according to claim 35, further comprising forming a third flange at said fold and connecting said third flange to a grounding line.

38. The method according to claim 37, further comprising molding a jacket over said insert and a portion of said grounding line to create a weatherproof seal.

* * * * *

UNITED STATES PATENT AND TRADEMARK OFFICE
CERTIFICATE OF CORRECTION

PATENT NO.     : 6,548,762 B2
DATED          : April 15, 2003
INVENTOR(S)    : Jiles et al.

It is certified that error appears in the above-identified patent and that said Letters Patent is hereby corrected as shown below:

Column 5,
Line 40, after "outer portion," insert -- said inner and outer portions formed from one piece, and --
Line 40, after "from" insert -- and substantially parallel to --

Column 7,
Lines 1-2, delete "a plurality of flexible fingers adapted to engage each other and lock the transmission line into place" and insert -- a first flange and a second flange, said second flange comprising two flexible fingers, generally opposed to one another and a gap between said two flexible fingers, said gap being smaller than a width of said finger of said first flange, such that when said finger of said first flange is inserted into said gap, said flexible opposing fingers of said second flange grip said finger of said first flange, locking said finger of said first flange into place --
Line 11, after "from" insert -- and substantially parallel to --
Line 13, after "wherein" insert -- said inner portion and said outer portion are formed from one piece, --
Line 13, delete "contacts" and insert -- contacting --
Line 15, delete "is" and insert -- being --
Line 27, after "portion," insert -- said inner portion and said outer portion being formed of one piece and --
Line 28, after "from" insert -- and substantially parallel to --

Column 8,
Line 7, after "portion," insert -- said inner portion and said outer portion being formed of one piece --
Lines 8 and 19, after "from" insert -- and substantially parallel to --

Signed and Sealed this

Sixth Day of April, 2004

JON W. DUDAS
*Acting Director of the United States Patent and Trademark Office*